United States Patent [19]

Becker

[11] 4,287,944
[45] Sep. 8, 1981

[54] HEAT EXCHANGER FOR COOLING PROCESS GASES WHICH ARE UNDER HIGH PRESSURE AND TEMPERATURE

[75] Inventor: Jörgen Becker, Gummersbach, Fed. Rep. of Germany

[73] Assignee: L. & C. Steinmüller GmbH, Gummersbach, Fed. Rep. of Germany

[21] Appl. No.: 8,796

[22] Filed: Feb. 1, 1979

[30] Foreign Application Priority Data

Feb. 1, 1978 [DE] Fed. Rep. of Germany ....... 2804187

[51] Int. Cl.³ .............................................. F28F 9/02
[52] U.S. Cl. ..................................... 165/158; 122/32
[58] Field of Search ............................... 165/158–161; 422/201, 197; 176/58, 42, 86, 87; 122/132, 133, 131

[56] References Cited

U.S. PATENT DOCUMENTS 1,798,330  3/1931  Leek ................................ 165/160 X
2,303,613 12/1942  Charlton ............................ 165/160
3,902,463  9/1975  Michel ............................. 165/158

Primary Examiner—Samuel Scott
Assistant Examiner—Theophil W. Streule, Jr.
Attorney, Agent, or Firm—Becker & Becker, Inc.

[57] ABSTRACT

A heat exchanger for cooling process gases which are under high pressure and temperature. The withdrawn heat is used for high pressure steam generation in accordance with the natural circulation principle. The heat exchanger comprises U tubes suspendedly inserted in a plate or tube sheet. Two chambers are provided above the plate, are separated from one another, and are intended for the coolant-steam circulation. A housing surrounds the U tube bundle and is connected to and below the chambers. The housing has at least one process gas inlet and at least one process gas outlet. One arm of each U tube is constructed as a double tube. The inner tube has the function of a gravity tube, and the remaining annular conduit, as well as the remainder of each U tube, have the function of risers.

2 Claims, 4 Drawing Figures

HEAT EXCHANGER FOR COOLING PROCESS GASES WHICH ARE UNDER HIGH PRESSURE AND TEMPERATURE

The present invention relates to a heat exchanger for cooling process gases which are under high pressure and high temperature. The withdrawn heat is used for high pressure steam generation in accordance with the natural circulation principle. The heat exchanger comprises U tubes suspendedly inserted in a plate. Two chambers are provided above the plate, are separated from one another, and are intended for the coolantsteam cycle or circulation. A housing, which surrounds the U tube bundle, has at least one process gas inlet and at least one process gas outlet and is connected to the chambers, below them.

Heat exchangers are known whereby the tubes are entirely constructed as double or twin tubes. In this connection, one end of one of each of the tubes is inserted in a tube plate, while the other end of the outer tube is closed off by a cap. The use of double tubes with such heat exchangers is based upon the physical fact that no heat should be transferred to the coolant guided in the inner tube (the gravity tube), in order to assure, in all loading conditions, the natural circulation principle which is used. The water vapor mixture flowing in the outer annular conduit serves the downwardly flowing coolant gravity tube as an absolute thermal insulation since, as is well known, no thermal flow can take place during the absence of a temperature drop.

A different heat exchanger construction utilizes suspended U tubes which are mounted in a tube sheet. With this construction, the gravity tube is subjected to heat in the same manner as is the riser. As is well known, heated gravity tubes lead to circulation disturbances in natural circulation systems, at least in the start-up state of the system and during sudden changes in pressure.

It is therefore an object of the present invention to provide a heat exchanger which, while maintaining the simple U tube guiding, affects the coolant flow by structural measures in such a way that when using the natural circulation principle, coolant circulation instabilities no longer occur in the start-up phase nor during temperature fluctuations.

This object, and other objects and advantages of the present invention, will appear more clearly from the following specification in connection with the accompanying drawings, in which.

Figure 1:
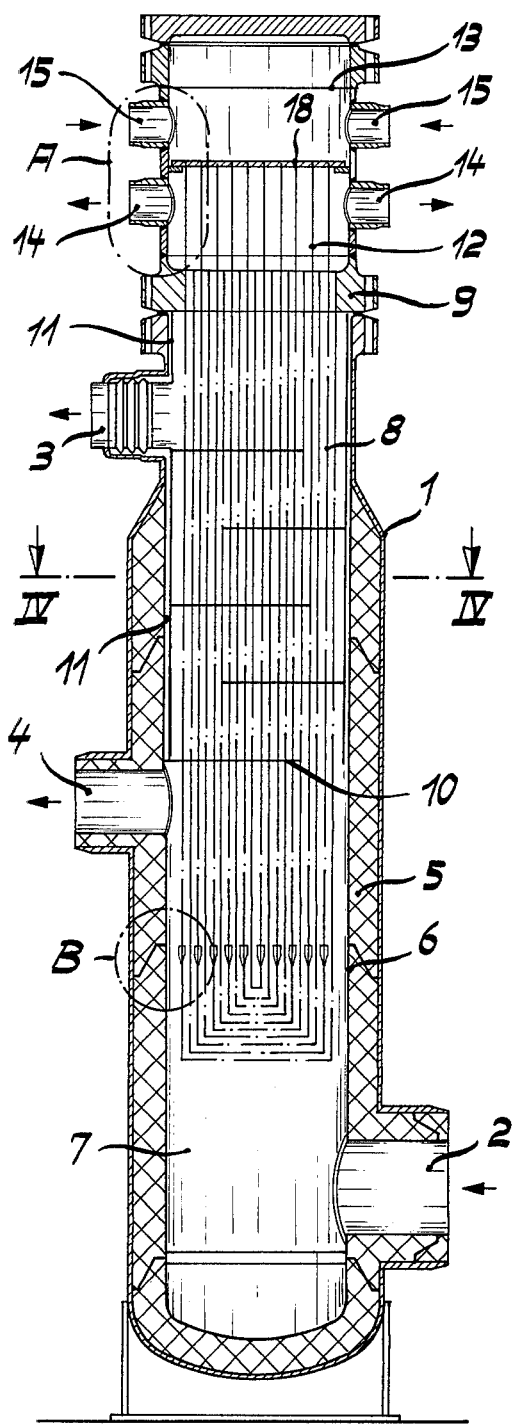
FIG. 1 is a longitudinal section through a heat exchanger according to the present invention.

The heat exchanger of the present invention is characterized primarily in that one arm of each U tube is constructed as a double tube. The inner tube has the function of a gravity tube, and the remaining annular conduit, as well as the remainder of each U tube, have the function of risers.

Pursuant to a preferred embodiment of the present invention, it is proposed that the U tube ends be quadratically arranged in the tube sheet. In this connection, a smaller diameter connection of the other U tube arm is arranged between every two larger diameter double tube connections.

Referring now to the drawings in detail, the heat exchanger of the present invention comprises a housing 1 having a process gas inlet 2 and a process gas outlet 3, as well as a bypass line 4. By means of the hotter process gases exiting through the bypass line 4, the process gas outlet temperature can be brought to a desired value. Pursuant to the embodiment illustrated in the drawings, the inside of the housing 1 is provided with a masonry wall 5 which, on that side thereof which faces the heat exchanger tubes, is covered with a closely adjoining plating 6. A tube bundle 8 formed of U tubes is inserted in the free space 7 of the receptacle 1. The U tubes are inserted in the tube sheet 9, where they are held.

Figure 2:
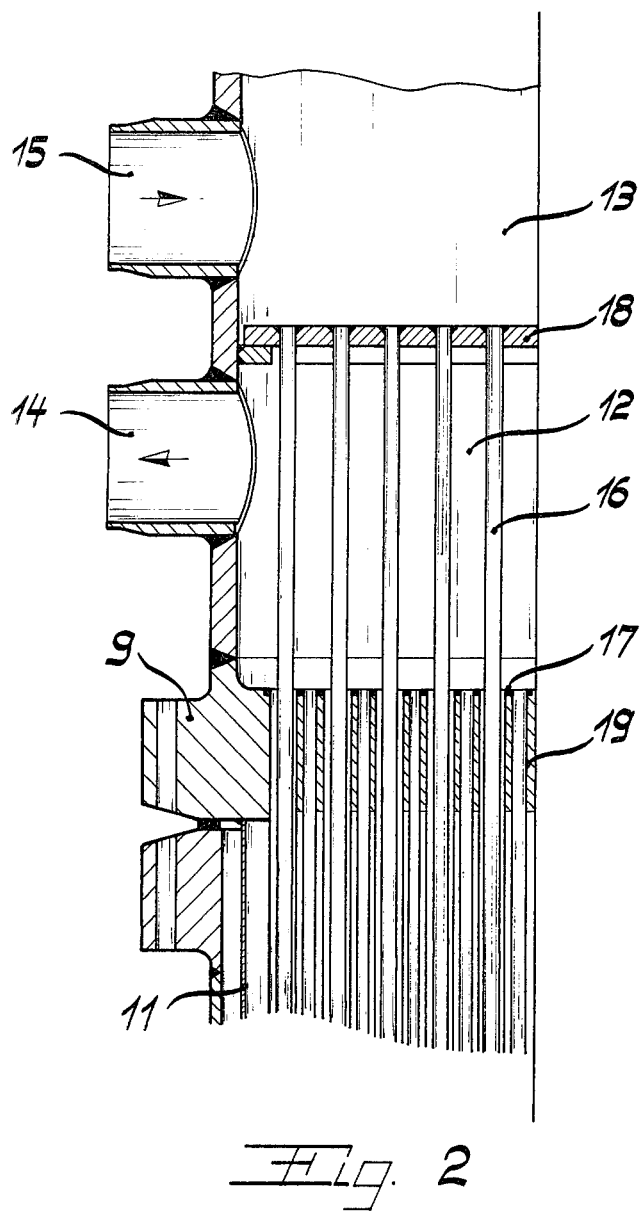
FIG. 2 is an enlargement of the encircled portion A of FIG. 1.

The tube sheet 9 separates the housing 1 into a process gas plenum (free space 7) below the tube sheet and a coolant plenum above the tube sheet. To improve the heat transfer, baffle plates 10 are built in above the bypass line 4. An additional plating 11, which is sealed off relative to the tube sheet 9 and the process gas outlet 3, eliminates bypass disturbances. Two chambers 12 and 13 are located above the tube sheet 9 to form the coolant plenum. Of these, the chamber 13 is a first chamber which provides for inlet coolant-steam while the chamber 12 is a second chamber which accumulates coolant after the coolant has passed through the U-tube bundle 8. The chamber 12 is provided with outlet pipe connections 14, and the chamber 13 is provided with inlet pipe connections 15. The connections 14 and 15, in the form of gravity tubes and risers, are connected with a drying or steam cylinder arranged above the heat exchanger. As shown in FIG. 2, the respective inner tube 16 of one arm of the double tube 17 of a U tube is continued upwardly through the chamber 12 and is held in a further tube sheet 18.

Figure 3:
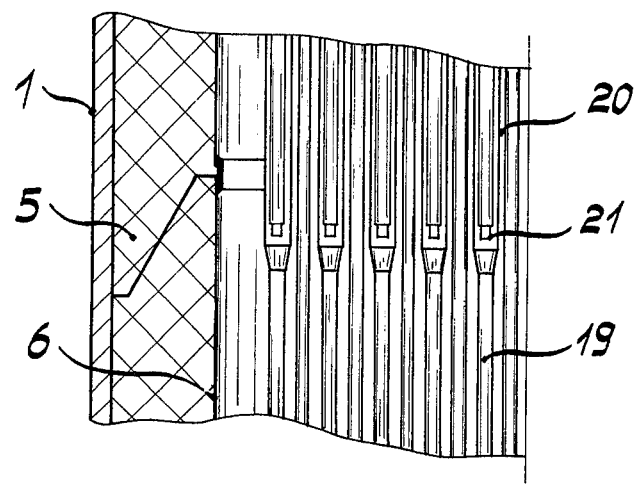
FIG. 3 is an enlargement of the encircled portion B of FIG. 1.

Shortly before the U-like deflection, that arm of the U tube which is constructed as the double tube 17 changes into a single tube 19 (FIG. 3). In this connection, the cross section of the continuing tube is expediently kept smaller. In order to assure the riser effect which appears at the point of reduction, namely the bight portion, not only for the continuing tube 19 but also for the annular conduit 20, a deflecting plate 21 is additionally provided at the end of each inner tube 16 of the double tube 17.

Figure 4:
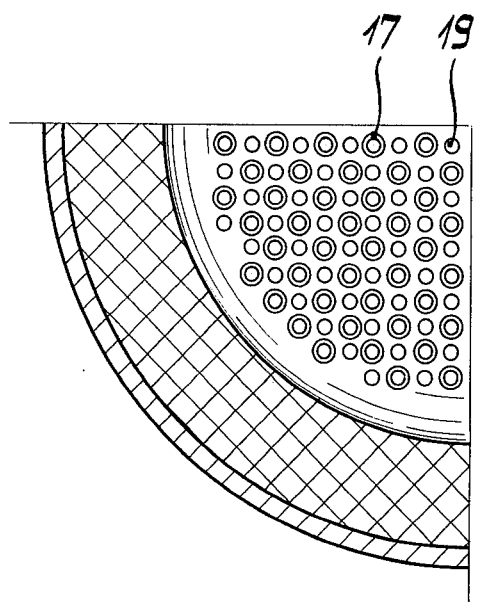
FIG. 4 is a partial section taken along the line IV-IV of FIG. 1.

The preferred embodiment of the present invention shown in FIG. 4 illustrates the larger diameter tube of the double tube U tube arm, and the smaller diameter tube of the other U tube arm as they are arranged relative to one another. This arrangement is also maintained in the tube sheet 9, and in particular in such a way that between every two larger diameter double tube connections, there is arranged a smaller diameter connection of the other U tube arm. In so doing, the tube sheet 9 can be optimally utilized with regard to the weakening factor.

The advantages obtained with the present invention consists in that, while maintaining the simple U tube construction in connection with the structural measures, namely use of a double tube for one of the U tube arms in a heat exchanger working by natural circulation, flow instabilities right in the start-up phase and during pressure fluctuations no longer occur. From the physical standpoint, this situation is due to the fact that the coolant is first guided without heat absorption into the immediate region of the deepest point of the natural circulation system. This assures that all of the tubes which are subjected to process gas clearly have the function of risers. This holds true not only for the single tube U tube arm, but also for the annular conduit of the double tube.

The present invention is, of course, in no way restricted to the specific disclosure of the specification or drawings, but also encompasses any modifications within the scope of the appended claims.

What I claim is:

1. A heat exchanger for cooling process gases which are under high pressure and high temperature, with withdrawn heat being used for high pressure steam generation in accordance with natural circulation principles to influence cooling medium flow, said heat exchanger comprising in combination:

a housing having at least one process gas inlet and at least one process gas outlet;

a tube sheet extending across the inside of said housing separating the housing into a process gas plenum and a coolant gas plenum above the process gas plenum;

the coolant plenum being divided into two chambers by said tube sheet, said chambers being separated from one another to provide a first chamber for inlet coolant-steam and a second chamber below the first chamber for outlet coolant-steam in order to provide coolant-steam circulation; and a U-tube bundle suspended on said tube sheet in said housing and extending into the process gas plenum from the coolant plenum, each U-tube of said U-tube bundle having the upper portion of a first leg of the "U" at least some of said tubes being in the form of a double tube having an inner tube surrounded by an annular conduit, the inner tube being in open communication with the first chamber and the annular conduit being an open communication with the second chamber, the remaining portion of said first leg continuing as a single tube through the bight of said U-tube and into a second leg thereof which second leg opens into the second chamber, whereby said inner tube has the function of a gravity tube for delivering coolant steam into the U-tube whereby said annular conduit and said single tube have the function of risers constructively arranged to maintain U-tube guidance of cooling medium flow so that by application of natural circulation principles cooling- medium-circulation instabilities are avoided during starting phases and during pressure fluctuations.

2. A heat exchanger in combination according to claim 1, in which said annular conduit of said double tube has a larger diameter than does said single tube, the U tube ends being arranged quadratically in said tube sheet in such a way that a smaller diameter single tube is arranged between every two larger diameter double tubes.

* * * * *